(12) United States Patent
Dai et al.

(10) Patent No.: US 8,665,145 B2
(45) Date of Patent: Mar. 4, 2014

(54) SYSTEM AND METHOD FOR DETERMINING THE HEADING ANGLE OF A VEHICLE

(75) Inventors: Liwen Dai, Chino Hills, CA (US); Yunfeng Shao, Torrance, CA (US); Daniel J. Eslinger, Huntington Beach, CA (US)

(73) Assignee: Navcom Technology, Inc., Torrance, CA (US)

( * ) Notice: Subject to any disclaimer, the term of this patent is extended or adjusted under 35 U.S.C. 154(b) by 0 days.

(21) Appl. No.: 13/093,020

(22) Filed: Apr. 25, 2011

(65) Prior Publication Data

US 2011/0267227 A1 Nov. 3, 2011

Related U.S. Application Data

(60) Provisional application No. 61/328,807, filed on Apr. 28, 2010.

(51) Int. Cl.
*G01S 19/53* (2010.01)
*G01S 19/44* (2010.01)
*G01S 19/55* (2010.01)

(52) U.S. Cl.
USPC ............. 342/357.36; 342/357.27; 342/357.38

(58) Field of Classification Search
USPC ............. 342/357.26, 357.27, 357.36, 357.38; 701/468, 470
See application file for complete search history.

(56) References Cited

U.S. PATENT DOCUMENTS

| | | | |
|---|---|---|---|
| 4,963,889 A | 10/1990 | Hatch | |
| 5,349,531 A | 9/1994 | Sato et al. | |
| 5,757,646 A | 5/1998 | Talbot et al. | |
| 6,754,584 B2 | 6/2004 | Pinto et al. | |
| 7,136,751 B2 | 11/2006 | Pinto et al. | |
| 7,298,319 B2 | 11/2007 | Han et al. | |
| 7,498,979 B2 | 3/2009 | Liu et al. | |
| 2007/0075896 A1 | 4/2007 | Whitehead et al. | |

OTHER PUBLICATIONS

The International Search Report and The Written Opinion of The International Searching Authority, Jul. 11, 2011 (13 pages).
James Pinchin et al; "Precise kinematic positioning using single frequency GPS receivers and an integer ambiguity constreint", Position, Location and Navigation Symposium, 2008 IEEE/ION, IEEE, Piscataway, NJ, USA, May 5, 2008, pp. 600-605.
"Reducing the Time-To-Fix for Stand-Alone Single-Frequency GNSS Attitude Determination", Jan. 1, 2010, XP55001253, Retrieved from the Internet URL: http://www.ion.org/search/purchase_paper.cfm?jp=p&id=8836 [retrieved on Jun. 22, 2011].
Development of a DGPS/MEMS IMU Integrated System for Navigation in Urban Canyon Conditions, Jan. 1, 2005, XP55001555, Retrieved from the Internet URL: http://plan.geomatics.ucalgary.ca/papers/05GNSS_Godha_and_Cannon_HongKong.pdf [retrieved on Jun. 28, 2011].

(Continued)

*Primary Examiner* — Dao Phan
(74) *Attorney, Agent, or Firm* — Brinks Gilson & Lione

(57) ABSTRACT

A system and method for determining the heading angle of a vehicle includes first and second antennas associated with the vehicle. The first and second antennas are configured to receive signals comprising global positioning system data. A receiver front end is configured to receive the signals comprising global positioning system data. An electronic data processor is capable of receiving the global positioning system data from the receiver front end. The data processor is configured or programmed to execute a method to determine the attitude of the vehicle which may include the heading angle of the vehicle.

27 Claims, 2 Drawing Sheets

(56) References Cited

OTHER PUBLICATIONS

Daum, F: "Virtual measurements for nonlinear filters", Decision and Control, 1997. Proceedings of The 36th IEEE Conference O N San Diego, CA, USA Dec. 10-12, 1997, New York, NY, USA, IEEE, US, vol. 2, Dec. 10, 1997, pp. 1657-1662.

Tom Ford, et al., "Beeline RT20—a Compact, Medium Precision Positioning system with an Attitude," Novatel Inc. , 1997.

SYSTEM AND METHOD FOR DETERMINING THE HEADING ANGLE OF A VEHICLE

CROSS REFERENCE TO RELATED APPLICATION

This application claims priority to U.S. Provisional Application 61/328,807 entitled SYSTEM AND METHOD FOR DETERMINING THE HEADING ANGLE OF A VEHICLE, filed on Apr. 28, 2010, the entirety of which is herein incorporated by reference.

BACKGROUND

1. Field of the Invention

The invention is directed to systems and methods for determining the heading angle of a vehicle.

2. Description of the Known Art

The global positioning system ("GPS") is a space-based global navigation satellite system. Generally, the system provides reliable positioning and timing services to worldwide users on a continuous basis anywhere on or near the Earth which has an unobstructed view of four or more GPS satellites.

GPS systems using two antennas can be utilized to determine the heading (e.g., yaw), roll and pitch of a vehicle. Attitude refers to the heading, roll and pitch of a vehicle. For attitude determination, some constraints can be applied, such as the distances between the two GPS antennas, or highly bounded attitude information such as the ranges of expected pitch and roll angles for land navigation, machine control, and guidance. Additionally, it is known to introduce a distance constraint to a Kalman filter procedure. However, this distance constraint requires the linearization to be accurate. Because the distances between the two GPS antennas are generally very short, typically at or around 1 meter, the design matrix, which is used to process the GPS measurement data to provide intermediate calculations toward a final position or attitude estimate, cannot be determined precisely from the float solution. Thus, the Kalman filter process could diverge if the non-linearity is not taken into consideration correctly. Another issue is that the real-time kinematic float solution may not satisfy the baseline length constraints well after the integer ambiguity resolution procedure is applied.

SUMMARY

In one embodiment, the system has first and second antennas associated with the vehicle. The first and second antennas are configured to receive signals comprising global positioning system data. A receiver front end is configured to receive the signals comprising global positioning system data. An electronic data processor is capable of receiving the global positioning system data from the receiver front end. The data processor is configured or programmed to execute a method to determine the attitude of the vehicle which may include the heading angle of the vehicle.

In one example, the method executed by the electronic data processor includes the steps of measuring carrier phases of carriers associated with the signals received from the first and second antennas. The processor determines the ambiguity solution sets for the measured carrier phases using a known baseline length between the first and second antennas to satisfy a constant length and attitude constraints in a search process within a real-time kinematic search engine.

Additionally or alternatively, the processor or error reduction filter processes the measured carrier phases in ambiguity solution sets associated with the signals using the known baseline length between the first and second antennas as a virtual measurement in the filter. The processor can estimate locations of the first and second antennas using the filtered carrier phases and filtered ambiguity solution sets of the first and second signals. The processor will be able to determine the heading angle of the vehicle based on the estimated locations of the first and second antennas.

DETAILED DESCRIPTION

Figure 1:
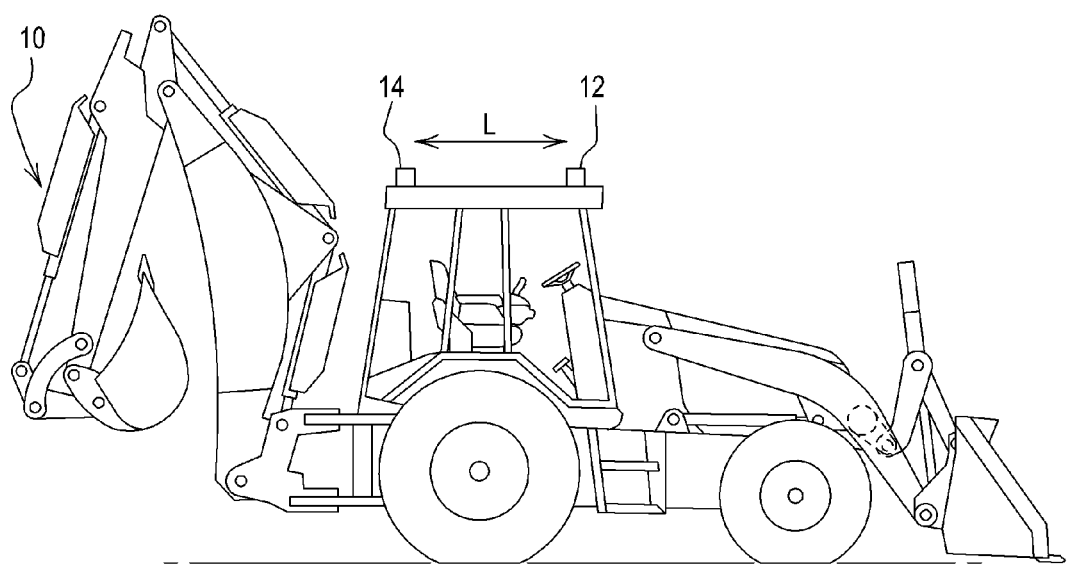
FIG. 1 illustrates a vehicle incorporating one embodiment of a system and method for determining the heading angle of the vehicle.

Referring to FIG. 1, a vehicle 10 incorporating the system for determining a heading angle of a vehicle or an implement connected to the vehicle 10 is shown. Further, the system could be incorporated on an implement that is not connected to the vehicle. In this embodiment, the vehicle 10 is a backhoe vehicle and the implement comprises a front attachment (e.g., bucket), a rear attachment or associated movable members (e.g., arms or booms); however, any one of a number of different types of vehicles or implements may utilize the system for determining a heading angle of the vehicle or the implement. For example, the vehicle 10 or implement could be an automobile, a tractor trailer, construction equipment, forestry equipment, or agricultural equipment. Additionally, the vehicle 10 or implement does not necessarily need to be a land based, but could also be an air or sea capable vehicle or implement such as an airplane or a ship.

The vehicle 10 includes both a first antenna 12 and a second antenna 14. The first and second antennas are configured to receive signals comprising global positioning data. As well known, global positioning data is generally produced by a global positioning satellite system, but maybe also augmented by a land based system as well. In this embodiment, the first antenna 12 and the second antenna 14 are arranged in a longitudinal manner. In other words, the antennas are generally positioned along the length of the vehicle. However, it should be understood that the antennas may be positioned in a latitudinal manner, i.e. along the width of the vehicle 10 or implement, or mounted otherwise on the vehicle or the implement.

Additionally, it should be noted that the length L between the first antenna 12 and the second antenna 14 is a known baseline length. Generally, this known baseline length is about one meter plus/minus ten percent. However, it should be understood that the known baseline length may be less than one meter or may be longer than one meter depending on the application of the system for determining the heading angle of the vehicle 10.

Figure 2:
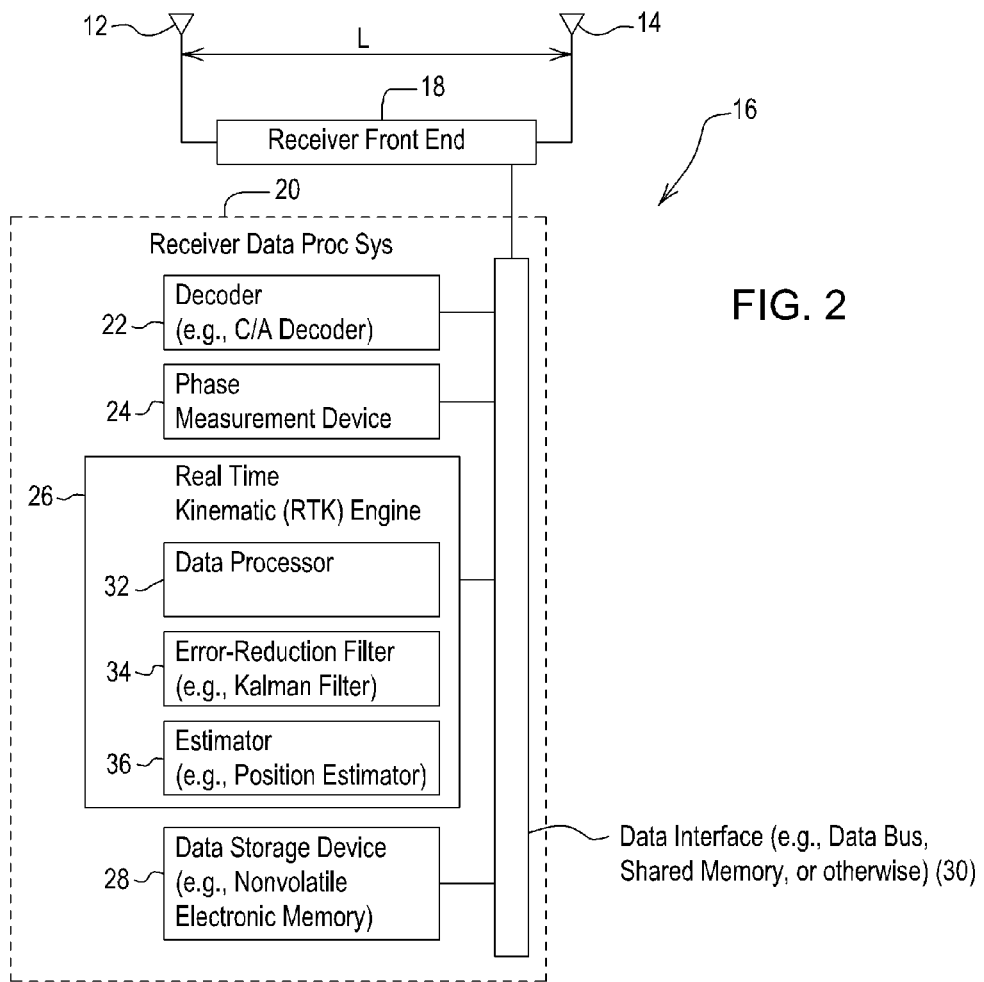
FIG. 2 is a block diagram of one embodiment of the system for determining the heading angle of the vehicle of FIG. 1.

Referring to FIG. 2, the system 16 for determining a heading angle of the vehicle 10 or an implement is shown. As described in the previous paragraphs, the first antenna 12 and the second antenna 14 have a known baseline length L between them. The first antenna 12 and the second antenna 14 are in communication and coupled to a receiver front end 18. The receiver front end 18 receives first signals comprising global positioning data from the first antenna 12 and second signals comprising global positioning system data from the second antenna 14.

The system 16 also includes a computer system 20, which may be referred to as a receiver data processing system. The computer system 20 comprises a decoder 22, a phase measurement device 24, a real-time kinematic ("RTK") engine 26, and a data storage device 28. The computer system 20 also includes a data interface 30. The data interface 30 is essentially a data bus or shared electronic memory connecting or supporting communication among the receiver front end 18, the decoder 22, the phase measurement device 24, the RTK engine 26, and the data storage device 28 to each other. Generally, the data interface 30 is a physical conductor. However, the data interface 30 may take any one of a variety of suitable forms, such as a wireless interface.

The decoder 22 receives the first and second signals from the receiver front end 18 and decodes these signals so they may be processed by the phase measurement device 24 and the real-time kinematic engine 26. More specifically, decoder 22 decodes pseudo codes (e.g., coarse acquisition codes, precise codes or pseudo-random noise codes) encoded on the first signals and second signals to estimate pseudo ranges between each of the antennas 12 and 14 and corresponding satellites capable of transmitting the first and second signals. The phase measurement device 24 measures the carrier phases of carriers associated with the first and second signals.

The real-time kinematic engine 26 includes a data processor 32, an error-reduction filter 34, and an estimator 36. The data processor 32 determines ambiguity solution sets for the measured carrier phases using the known baseline length L to satisfy constant length and attitude constraints in a search process.

In one embodiment, the data processor 32 or the error-reduction filter 34 (e.g., a Kalman filter or other predictive filter) applies processing or filtering to the measured carrier phases in ambiguity solution sets associated with the signals using the known baseline length between the first antenna 12 and the second antenna 14 as a virtual measurement in the error-reduction filter 34 where a weight of the virtual measurement in the error-reduction filter 34 is proportional to a position variance. For example, the error-reduction filter 34 applies a filtering process using a first order Taylor series expansion, to the measured carrier phases and ambiguity solution sets associated with the first and the second signals. This filtering process is done by using the known baseline length L as a virtual measurement in the error-reduction filter 34 where the weight of the virtual measurement in the error-reduction filter 34 is proportional to a position variance.

The estimator 36 estimates locations of the first antenna 12 and the second antenna 14 using the filtered carrier phases and filtered ambiguity solution sets of the first and second signals. The data processor 32 can determine the heading angle (or the attitude angles) of the vehicle or its implement based on the estimated locations of the first antenna 12 and the second antenna 14. The data processor 32 may be further configured to modify the variance of the virtual measurement based on an accuracy of a float solution after both carrier phases and pseudo-ranges have been measured. Additionally, the processor 32 can be configured to apply a double differencing equation to the measured carrier phases and the pseudo ranges of the first and second signals before applying the error-reducing filter (e.g., Kalman filter) to the measured carrier phases and pseudo ranges of the first and second signals. The term "double-difference" refers to the observable which has been formed by differencing between satellites and between stations. The double difference equation is based on subtracting two single difference carrier phase measurements measured at a GPS system 16 and at a reference station (e.g., reference station 44 or reference station 54 in FIG. 3) with respect to satellite signals from two different satellites, for example. The double differencing equation is applied to carrier phase measurements to eliminate or ameliorate the deleterious effects of receiver clock bias (e.g., by the first difference between carrier phase measurements) and the satellite clock bias (e.g., by the second difference between carrier phase measurements).

In order to investigate the effect of non-linearity error on the accuracy of virtual measurements, the bounds of the linearized error are determined by the processor 32 as described in the paragraphs that follow. Of course, the processor 32 may be a single processor or may comprise any of the following items: one or more microprocessors, one or more microcontrollers, one or more data processors, one or more digital application specific processors (ASIC's), one or more programmable logic arrays (PLA's), or other semiconductors, or electronic data processing devices, circuits or modules capable of executing processor executable code.

Assume $L_0$ is the length of a known baseline and sigma $\sigma_{L_0}$ is the a priori accuracy of the fixed baseline length (sub-centimeter typically). Suppose that $(x_1^0, x_2^0, x_3^0)$ are the current optimal estimates of the rover position (these are the first three states of the state vector X. Y represents the rest of the states, including ambiguity, residual ionosphere, and troposphere states). Suppose also that $(x_1^{ref}, x_2^{ref}, x_3^{ref})$ are the coordinates of the known reference location. Then the pre-fit residual is denoted as Z, the design matrix is considered as H and the measurement covariance is indicated as R. The virtual measurement is given by Eqs (1)-(3):

$$Z = \hat{L} - L_0, \text{ where } \hat{L} = \sqrt{(x_1^0 - x_1^{ref})^2 + (x_2^0 - x_2^{ref})^2 + (x_3^0 - x_3^{ref})^2} \quad (1)$$

$$V = \left(\frac{x_1^0 - x_1^{ref}}{\hat{L}} \quad \frac{x_2^0 - x_2^{ref}}{\hat{L}} \quad \frac{x_3^0 - x_3^{ref}}{\hat{L}} \quad 0\right)\begin{pmatrix}\delta x_1 \\ \delta x_2 \\ \delta x_3 \\ Y\end{pmatrix} - \quad (2)$$

$$(\hat{L} - L_0) + F(x_1^0, x_2^0, x_3^0) \approx HX - Z$$

$$R = f(\hat{L}, \sigma_{\hat{L}})^2 \cdot \sigma_{L_0}^2 \quad (3)$$

where $X = (\delta x_1 \, \delta x_2 \, \delta x_3 \, Y)^T$, $\sigma_{L_0}$ is the a priori position accuracy of the baseline vector and $f(\hat{L}, \sigma_{\hat{L}})$ is a simple inflating function (which depends on the baseline length and its accuracy) that needs to reflect the linearization errors.

Assume $L_0$ is the length of a known baseline and sigma $\sigma_{L_0}$ is the a priori accuracy of the fixed baseline length (sub-centimeter typically). Suppose that $(x_1^0, x_2^0, x_3^0)$ are the current optimal estimates of the rover position (these are the first three states of the state vector X. Y represents the rest of the states, including ambiguity, residual ionosphere, and troposphere states). Suppose also that $(x_1^{ref}, x_2^{ref}, x_3^{ref})$ are the coordinates of the known reference location. Then the pre-fit residual is denoted as Z, the design matrix is considered as H and the measurement covariance is indicated as R.

The virtual measurement is given by Eqs (1)-(3):

$$Z = \hat{L} - L_0, \text{ where } \hat{L} = \sqrt{(x_1^0 - x_1^{ref})^2 + (x_2^0 - x_2^{ref})^2 + (x_3^0 - x_3^{ref})^2} \quad (1)$$

$$V = \begin{pmatrix} \frac{x_1^0 - x_1^{ref}}{\hat{L}} & \frac{x_2^0 - x_2^{ref}}{\hat{L}} & \frac{x_3^0 - x_3^{ref}}{\hat{L}} & 0 \end{pmatrix} \begin{pmatrix} \delta x_1 \\ \delta x_2 \\ \delta x_3 \\ Y \end{pmatrix} - \quad (2)$$

$$(\hat{L} - L_0) + F(x_1^0, x_2^0, x_3^0) \approx HX - Z$$

$$R = f(\hat{L}, \sigma_{\hat{L}})^2 \cdot \sigma_{L_0}^2 \quad (3)$$

$X=(\delta x_1 \, \delta x_2 \, \delta x_3 \, Y)^T$, $\sigma_{L_0}$ is the a priori position accuracy of the baseline vector and $f(\hat{L}, \sigma_{\hat{L}})$ is a simple inflating function (which depends on the baseline length and its accuracy) that needs to reflect the linearization errors.

Next, the processor 32 updates the extended Kalman filter state vector processing for this virtual constraint measurement. $F(x_1^0, x_2^0, x_3^0)$ second order remaining term which can be described as $$\frac{1}{2}\lambda_{min} \cdot \|\delta X\|^2 \leq F(x_1^0, x_2^0, x_3^0) \leq \frac{1}{2}\lambda_{max} \cdot \|\delta X\|^2, \quad (4)$$

where $\lambda_{min}$ and $\lambda_{max}$ are the minimum and maximum Eigenvalues of the Hessian matrix $\partial_{xx}^2 F(x)$.

For the distance model $$\hat{L} = \sqrt{(\hat{x}_1^0 - x_1^{ref})^2 + (\hat{x}_2^0 - x_2^{ref})^2 + (\hat{x}_3^0 - x_3^{ref})^2}, \quad (5)$$

where $\Delta x_1 = \hat{x}_1^0 - x_1^{ref}$, $\Delta x_2 = \hat{x}_2^0 - x_2^{ref}$, $\Delta x_3 = \hat{x}_3^0 - x_3^{ref}$ are the differences between the coordinates of the reference and rover associated with the measurement, the Hessian matrix is $$\partial_{xx}^2 \overline{L} = \frac{1}{\sqrt{L_0^3}} \begin{bmatrix} \Delta x_2^2 + \Delta x_3^2 & -\Delta x_1 \Delta x_2 & -\Delta x_1 \Delta x_3 \\ -\Delta x_1 \Delta x_2 & \Delta x_1^2 + \Delta x_3^2 & -\Delta x_2 \Delta x_3 \\ -\Delta x_1 \Delta x_3 & -\Delta x_2 \Delta x_3 & \Delta x_1^2 + \Delta x_2^2 \end{bmatrix} \quad (6)$$

with the extreme Eigenvalues being $\lambda_{min}=0$ and $\lambda_{max}=1/L_0$. From equation (6), the bounds for the nonlinearly error caused by ignoring the remaining higher order terms are:

$$0 \leq F(x_1^0, x_2^0, x_3^0) \leq \frac{\|\delta X\|^2}{2L_0} = \frac{(\delta_{x_1}^2 + \delta_{x_2}^2 + \delta_{x_3}^2)}{2L_0}. \quad (7)$$

If the first antenna 12 and the second antenna 14 are arranged in a longitudinal manner, the processor 32 is further configured to determine a heading angle ($\alpha$) and an accuracy ($\sigma_\alpha$) as:

$$\alpha = \tan^{-1}(E, N),$$

$$\sigma_\alpha = \frac{\sqrt{\frac{\sigma_E^2}{N^2} + \frac{E^2 \sigma_N^2}{N^4}}}{1 + \left(\frac{E}{N}\right)^2} = \frac{\sqrt{E^2 \sigma_N^2 + N^2 \sigma_E^2}}{N^2 + E^2}$$

wherein N and E are the baseline North and East components respectively, and $\sigma_N^2$ and $\sigma_E^2$ are corresponding variances. Further, the processor 32 is further configured to determine a pitch angle ($\phi$) as:

$$\varphi = \sin^{-1}\left(\frac{U}{\sqrt{N^2 + E^2 + U^2}}\right)$$

wherein U is a vertical offset component.

If the first antenna 12 and the second antenna 14 are arranged in a latitudinal manner, the processor 32 is further configured to determine a heading angle ($\alpha$) and an accuracy ($\sigma_\alpha$) as:

$$\alpha = \tan 2^{-1}(-N, E),$$

$$\sigma_\alpha = \frac{\sqrt{\frac{\sigma_E^2}{N^2} + \frac{E^2 \sigma_N^2}{N^4}}}{1 + \left(\frac{E}{N}\right)^2} = \frac{\sqrt{E^2 \sigma_N^2 + N^2 \sigma_E^2}}{N^2 + E^2}$$

wherein N and E are baseline North and East components respectively, and $\sigma_N^2$ and $\sigma_E^2$ are corresponding variances. Further, the processor 32 is further configured to determine the roll angle ($\phi$) as:

$$\varphi = \sin^{-1}\left(\frac{U}{\sqrt{N^2 + E^2 + U^2}}\right)$$

wherein U is vertical offset component

No matter which arrangement for the first antenna 12 and the second antenna 14 is utilized, the processor 32 may be further configured to apply an inflating function to inflate the accuracy when the baseline length is less than a certain threshold length in order to reflect linearized errors for the virtual baseline measurement of the baseline length. Generally, this baseline length is about 1 meter, +/− 10%. One of the such inflated weighting functions may be:

$$f(\hat{L}, \sigma_{\hat{L}}) = e^{\frac{12}{L}(\sigma_{\hat{L}} - 0.1)} \quad (8)$$

The processor 32 may be also configured determine the predefined number of the best ambiguity candidate sets by applying ambiguity search process In determining the best ambiguity candidate sets, the processor 32 is configured to determine the predefined number of the best ambiguity candidate sets by applying ambiguity search process. The best ambiguity candidate sets are based on candidate sets within the search space that fulfill a search criteria or provide a solution or an approximate solution within a target level of reliability, accuracy, and processing throughput time (e.g., for real-time availability of an attitude or heading solution for the vehicle or its implement), for example. Generally, the number of ambiguity candidate sets is about 30 to 40, but any suitable number may be stored in the data storage device 28.

The baseline length L can be considered as the virtual measurement using Eqs. (1)-(3) and (8) for the standard Kalman filter update to the float solution. However, the baseline length can be changed due to integer ambiguity resolution. The following procedure is used to ensure that the baseline length and possible attitude constraints can be satisfied for ambiguity resolution process.

For general ambiguity resolution purposes, the best and second best ambiguity candidate sets are stored during the search process. The ratio of their corresponding quadratic forms of the residuals, i.e. the F-ratio, is a critical statistic for ambiguity validation and quality control. In order to support the baseline constraints, the ambiguity search and fix procedure should take advantage of the known extra constraint. How this is done is an internal matter for this procedure, but the general requirement is that the baseline length of the fixed solution must satisfy this constraint.

In order to compute the fixed solution ($X_{fix}$) for each ambiguity candidate sets, the processor 32 is configured to use the following equation:

$$X = X_{float} + A*(N_{float} - N_{fix}).$$

The constraint to be satisfied for the predefined number of the best ambiguity candidate sets is (a) the known baseline length constraint in addition to an expected tolerance, (b) a known baseline attitude constraint in addition to the expected tolerance, (c) a float 3D baseline estimate ($X_{float}$) corresponding to float ambiguity ($N_f$), and/or (d) a fixed solution ($X_{fix}$) is computed by using an adjustment matrix A ($3 \times (N_f)$). If there is no or only one candidate ambiguity set satisfying the constraint, the processor 32 is configured to not provide a fixed solution ($X_{fix}$).

Figure 3:
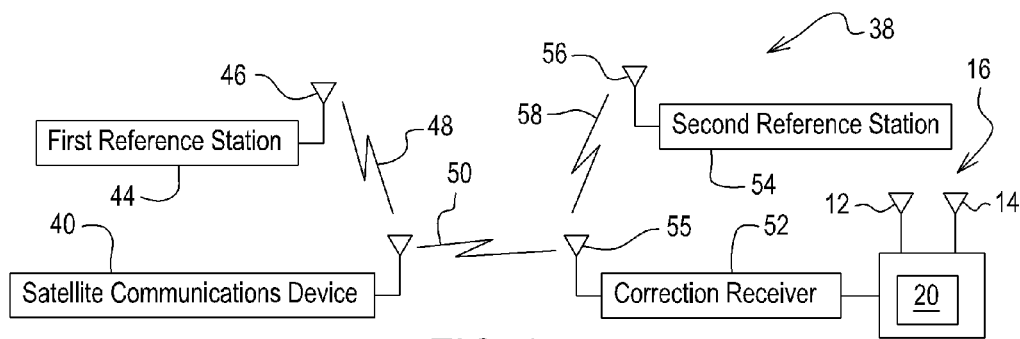
FIG. 3 is a block diagram of one embodiment illustrating GPS reference stations that may be used with the system illustrated in FIG. 2.

FIG. 3 illustrates one possible augmentation system 38 for providing differential data or correction data to the system 16 or receiver data processing system 20 of FIG. 2. Like reference numbers in FIG. 2 and FIG. 3 indicate like elements.

The correction receiver 52 of FIG. 3 may be coupled to the system 16 of FIG. 2 or may communicate with the system 16 or receiver data processing system 20 via a transmission line (e.g., and a data port coupled to the data interface 30). As illustrated, the system 16 of FIG. 2 may comprise a location-determining receiver with a receiver data processing system 20.

In one embodiment, the correction receiver 52 receives correction data (e.g., reference carrier phase correction data) from a first reference station 44, a second reference station 54, or both. For example, the first reference station 44 communicates correction data via one or more wireless or electromagnetic signals (48, 50) to the correction receiver 52 via the satellite communications device 40, which may comprise a satellite relay on a satellite vehicle in orbit above the Earth's surface. Similarly, the second reference station 54 is capable of communicating correction data via wireless or electromagnetic signals (58) via a terrestrial base station (e.g., incorporated into the second reference station 54) to the correction receiver 52.

In one configuration, the first reference station 44 comprises a reference location-determining receiver with an antenna 46 at a known or fixed location, a reference data processing system, and a transmitter or transceiver (e.g., satellite uplink transmitter). In one embodiment, the reference location-determining receiver detects carrier phase data associated with one or more carrier signals of navigation satellites (not shown) and determines an initial ambiguity solution or ambiguity solution set for multiple navigation satellite signals received at an antenna 46 of the location-determining receiver. The reference data processing system receives carrier phase data and the initial ambiguity solution corrects it, by using the known or fixed location of the reference location-determining receiver or its antenna 46, to determine an enhanced ambiguity solution. In one example, corrected carrier phase data comprises the estimated carrier phase and the enhanced ambiguity solution, or other data derived therefrom. In turn, the corrected carrier phase data or other correction data is transmitted via a wireless signal or electromagnetic signal (48, 50) via the satellite communications device 40 to the correction receiver 52. The correction receiver 52 receives the corrected carrier phase data or other correction data which is available for use by at least one of system, the real time kinematic engine 26, or the estimator 36 to determine a position of the vehicle or object associated with the system 16, or to estimate the position (or attitude) of the antennas (12, 14) of the system 16.

In one configuration, the second reference station 54 comprises a reference location-determining receiver with an antenna 56 at a known or fixed location, a reference data processing system, and a transmitter or transceiver (e.g., radio frequency or microwave base station). In one embodiment, the reference location-determining receiver detects carrier phase data associated with one or more carrier signals of navigation satellites and determines an initial ambiguity solution or ambiguity solution set for multiple satellite signals received at the antenna 56 of the location-determining receiver. If the correction receiver 52, and its antenna 55, are within range of transmitted wireless signal of the second reference station 54, in one configuration, the correction receiver 52 is capable of receiving correction data from the second reference station 54 via a wireless signal 58. In turn, the correction receiver 52 can provide any received correction data to the receiver data processing system 20 for enhancing the accuracy of the estimated position (or attitude) of the antennas (12, 14) of the system 16.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

We claim:

1. A system for determining a heading angle of a vehicle or a heading angle of an implement connected to the vehicle, the system comprising:

a first antenna associated with the vehicle, the first antenna configured to receive first signals comprising global positioning system data;

a second antenna associated with the vehicle, the second antenna configured to receive second signals comprising global positioning system data;

a receiver front end for receiving the first and second signals;

an electronic data processor capable of receiving the global position data from the receiver front end, the data processor configured or programmed to:

measure carrier phases of carriers associated with the first signals and second signals;

determine ambiguity solution sets for the measured carrier phases using a known baseline length between the first antenna and second antenna to satisfy constant length and attitude constraints in a search process within the real-time kinematic search engine;

determine at least a minimum number ambiguity solution sets for both the first and second signals from the first and second antennas by applying an ambiguity search process;

apply an error reduction filter to the measured carrier phases and ambiguity solutions sets associated with the first and second signals, using the known baseline length between the first and second antennas as a virtual measurement in the filter;

estimate locations of the first and second antennas using the filtered carrier phases and filtered ambiguity solution sets of the first and second signals; and determine the heading angle of the vehicle or the implement connected to the vehicle based on the estimated locations of the first antenna and the second antenna.

2. The system of claim 1 wherein a weight of the virtual measurement in the error-reduction filter is proportional to a position variance.

3. The system of claim 1 wherein the error reduction filter comprises a Kalman filter and is applied using a first order Taylor series expansion.

4. The system of claim 1, wherein the processor is further configured to modify the variance of the virtual measurement based on an accuracy of a float solution after both the carrier phases and pseudo ranges have been measured.

5. The system of claim, 1 wherein the first and second antennas are coupled to the vehicle along a longitudinal axis of the vehicle.

6. The system of claim 4, wherein the processor is further configured to determine a heading angle ($\alpha$) and an accuracy ($\sigma_\alpha$) as:

$$\alpha = \tan^{-1}(E, N),$$

$$\sigma_\alpha = \frac{\sqrt{\frac{\sigma_E^2}{N^2} + \frac{E^2 \sigma_N^2}{N^4}}}{1 + \left(\frac{E}{N}\right)^2} = \frac{\sqrt{E^2 \sigma_N^2 + N^2 \sigma_E^2}}{N^2 + E^2}$$

wherein N and E are the baseline North and East components respectively, and $\sigma_N^2$ and $\sigma_E^2$ are corresponding variances.

7. The system of claim 5, wherein the processor is further configured to determine a pitch angle ($\phi$) as:

$$\varphi = \sin^{-1}\left(\frac{U}{\sqrt{N^2 + E^2 + U^2}}\right)$$

wherein U is a vertical offset component.

8. The system of claim 5, wherein the processor is further configured to apply an inflating function to inflate the accuracy of the virtual baseline measurement when the baseline length is less than a certain threshold length in order to reflect linearized errors for the virtual baseline measurement of the baseline length.

9. The system of claim 7, wherein the certain threshold length is 1 meter.

10. The system of claim, 1 wherein the first and second antennas are coupled to the vehicle along a lateral axis of the vehicle.

11. The system of claim 9, wherein the processor is further configured to determine a heading angle ($\alpha$) and an accuracy ($\sigma_\alpha$) as:

$$\alpha = \tan2^{-1}(-N, E),$$

$$\sigma_\alpha = \frac{\sqrt{\frac{\sigma_E^2}{N^2} + \frac{E^2 \sigma_N^2}{N^4}}}{1 + \left(\frac{E}{N}\right)^2} = \frac{\sqrt{E^2 \sigma_N^2 + N^2 \sigma_E^2}}{N^2 + E^2}$$

wherein N and E are baseline North and East components respectively, and $\sigma_N^2$ and $\sigma_E^2$ are corresponding variances.

12. The system of claim 10, wherein the processor is further configured to determine the roll angle ($\phi$) as:

$$\varphi = \sin^{-1}\left(\frac{U}{\sqrt{N^2 + E^2 + U^2}}\right)$$

wherein U is vertical offset component.

13. The system of claim 11, wherein the processor is further configured to apply an inflating function to inflate the accuracy when the baseline length is less than a certain threshold length in order to reflect linearized errors for the virtual baseline measurement of the baseline length.

14. The system of claim 12, wherein the certain threshold length is 1 meter.

15. The system of claim 1, wherein the processor is configured to apply a double differencing equation to the measured carrier phases and the pseudo ranges of the first and second signals before applying the error reduction filter to the measured carrier phases and pseudo ranges of the first and second signals.

16. The system of claim 1, further comprising a decoder for decoding pseudo codes encoded on the first signals and second signals to estimate pseudo ranges between each of the antennas and corresponding satellites capable of transmitting the first and second signals.

17. The system of claim 1, wherein the predefined number of ambiguity candidate sets are between 30 to 40.

18. The system of claim 1, wherein the processor is configured to compute the fixed solution ($X_{fix}$) for each ambiguity candidate set using the following equation:

$$X_{fix} = X_{float} + A^*(N_{float} - N_{fix}).$$

19. The system of claim 18, wherein the constraint to be satisfied for the predefined number of ambiguity candidate sets is:

the known baseline length constraint in addition to an expected tolerance;

a known baseline attitude constraint in addition to the expected tolerance;

a float 3D baseline estimate ($X_{float}$) corresponding to float ambiguity ($N_f$);

a fixed solution ($X_{fix}$) is computed by using an adjustment matrix A ($3 \times (N_f)$).

20. The system of claim 18, wherein the processor is configured to not provide a fixed solution ($X_{fix}$) if there is no or only one of the predefined number of ambiguity candidate sets satisfying the constraint.

21. The system of claim 1, wherein the processor is configured to store the predefined number of ambiguity candidate sets.

22. A method for determining a heading angle for a vehicle, the method comprising:
   measuring carrier phases of carriers associated with first signals and second signals received by a first antenna and a second antenna, respectively, associated with a receiver front end;
   determining ambiguity solution sets for the measured carrier phases using a known baseline length between the first antenna and second antenna to satisfy constant length and attitude constraints in a search process within the real-time kinematic search engine;
      determining at least a minimum number ambiguity solution sets by applying an ambiguity search process for both the first and second signals from the first and second antennas;
   applying a filter process to the measured carrier phases and ambiguity solutions sets associated with the first signals and the second signals, the filter process using the known baseline length between the first antenna and the second antenna as a virtual measurement;
   estimating locations of the first antenna and the second antenna using the filtered carrier phases and filtered ambiguity solution sets of the first signal and the second signal; and
   determining the heading angle of the vehicle or an implement based on the estimated locations of the first antenna and the second antenna.

23. The method of claim 22 wherein a weight of the virtual measurement is proportional to a position variance.

24. The method of claim 22 wherein the applying comprises applying the filter process, via a Kalman filter, that uses a first order Taylor series expansion.

25. The method of claim 22 further comprising the step of modifying the variance of the virtual measurement based on an accuracy of a float solution after both the carrier phases and pseudo ranges have been measured.

26. The method of claim 22 further comprising the step of computing the fixed solution ($X_{fix}$) for each ambiguity candidate set using the following equation:

$$X_{fix}=X_{float}+A^*(N_{float}-N_{fix}).$$

27. The method of claim 26, wherein the constraint to be satisfied for the predefined number of ambiguity candidate sets is:
   the known baseline length constraint in addition to an expected tolerance;
   a known baseline attitude constraint in addition to the expected tolerance;
   a float 3D baseline estimate ($X_{float}$) corresponding to float ambiguity ($N_f$);
   a fixed solution ($X_{fix}$) is computed by using an adjustment matrix A ($3\times(N_f)$).

* * * * *